(12) United States Patent
Li

(10) Patent No.: US 8,970,180 B2
(45) Date of Patent: Mar. 3, 2015

(54) WIRELESS POWER TRANSMISSION SCHEDULING

(75) Inventor: Peng Li, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 333 days.

(21) Appl. No.: 12/715,988

(22) Filed: Mar. 2, 2010

(65) Prior Publication Data

US 2010/0253281 A1 Oct. 7, 2010

Related U.S. Application Data

(60) Provisional application No. 61/167,512, filed on Apr. 7, 2009.

(51) Int. Cl.
| | |
|---|---|
| *H02J 7/04* | (2006.01) |
| *H02J 7/00* | (2006.01) |
| *H04B 5/00* | (2006.01) |
| *H02J 7/02* | (2006.01) |

(52) U.S. Cl.
CPC ............ *H02J 7/0027* (2013.01); *H04B 5/0037* (2013.01); *H04B 5/0081* (2013.01); *H02J 7/025* (2013.01)
USPC .......................................... 320/155; 320/108

(58) Field of Classification Search
USPC .................... 320/108, 155; 702/63
See application file for complete search history.

(56) References Cited

U.S. PATENT DOCUMENTS

| | | | |
|---|---|---|---|
| 7,778,746 B2* | 8/2010 | McLeod et al. ................. | 701/22 |
| 7,890,776 B2* | 2/2011 | Diab et al. ..................... | 713/300 |
| 7,960,944 B2* | 6/2011 | Hoffman et al. ............... | 320/107 |
| 8,179,102 B2* | 5/2012 | Alberth et al. ................. | 320/162 |
| 8,183,827 B2* | 5/2012 | Lyon .............................. | 320/108 |
| 2002/0016151 A1 | 2/2002 | Romans | |
| 2004/0145342 A1 | 7/2004 | Lyon | |
| 2004/0155661 A1 | 8/2004 | Field et al. | |
| 2008/0197802 A1 | 8/2008 | Onishi et al. | |
| 2009/0284369 A1 | 11/2009 | Toncich et al. | |
| 2009/0286475 A1 | 11/2009 | Toncich et al. | |
| 2009/0286476 A1 | 11/2009 | Toncich et al. | |
| 2010/0171460 A1 | 7/2010 | Nakajima et al. | |

FOREIGN PATENT DOCUMENTS

| | | | |
|---|---|---|---|
| EP | 0314155 A2 | 5/1989 | |
| EP | 1148613 A2 | 10/2001 | |

(Continued)

OTHER PUBLICATIONS

International Search Report and Written Opinion—PCT/US2010/030278, International Search Authority—European Patent Office—Feb. 14, 2011.

(Continued)

*Primary Examiner* — Richard V Muralidar
(74) *Attorney, Agent, or Firm* — Knobbe Martens Olson & Bear LLP

(57) ABSTRACT

Exemplary embodiments are directed to wireless power transmission scheduling. A method may include scheduling for transmission of wireless power to one or more chargeable devices of the plurality of chargeable devices positioned within a charging region of a wireless charger based on at least one attribute associated with at least one of the wireless charger and at least one chargeable device of the plurality of chargeable devices.

30 Claims, 9 Drawing Sheets

(56) References Cited

FOREIGN PATENT DOCUMENTS

| | | |
|---|---|---|
| EP | 1626474 A2 | 2/2006 |
| EP | 1926195 A2 | 5/2008 |
| JP | H01148030 A | 6/1989 |
| JP | H11285159 A | 10/1999 |
| JP | 2001047178 A | 2/2001 |
| JP | 2001211558 A | 8/2001 |
| JP | 2001298870 A | 10/2001 |
| JP | 2003047178 A | 2/2003 |
| JP | 2004328916 A | 11/2004 |
| JP | 2004364388 A | 12/2004 |
| JP | 2005025382 A | 1/2005 |
| JP | 2006074867 A | 3/2006 |
| JP | 2006517378 A | 7/2006 |
| JP | 2007089341 A | 4/2007 |
| JP | 2007266396 A | 10/2007 |
| JP | 2007266963 A | 10/2007 |
| JP | 2008118285 A | 5/2008 |
| JP | 2008312294 A | 12/2008 |
| JP | 2010022105 A | 1/2010 |
| WO | 2008153138 A1 | 12/2008 |

OTHER PUBLICATIONS

Taiwan Search Report—TW099110794—TIPO—Apr. 2, 2013.

* cited by examiner

WIRELESS POWER TRANSMISSION SCHEDULING

CLAIM OF PRIORITY UNDER 35 U.S.C. §119

This application claims priority under 35 U.S.C. §119(e) to U.S. Provisional Patent Application 61/167,512 entitled "USING DEVICE REQUESTS TO FACILITATE WIRELESS POWER TRANSMISSION SCHEDULING" filed on Apr. 7, 2009, the disclosure of which is hereby incorporated by reference in its entirety.

BACKGROUND

1. Field

The present invention relates generally to wireless power, and more specifically to scheduling for transmission of wireless power from a wireless charger to a plurality of chargeable devices.

2. Background

Typically, each battery powered device requires its own charger and power source, which is usually an AC power outlet. This becomes unwieldy when many devices need charging.

Approaches are being developed that use over the air power transmission between a transmitter and the device to be charged. These generally fall into two categories. One is based on the coupling of plane wave radiation (also called far-field radiation) between a transmit antenna and receive antenna on the device to be charged which collects the radiated power and rectifies it for charging the battery. Antennas may be of resonant length in order to improve the coupling efficiency. This approach suffers from the fact that the power coupling falls off quickly with distance between the antennas. So charging over reasonable distances (e.g., >1-2 m) becomes difficult. Additionally, since the system radiates plane waves, unintentional radiation can interfere with other systems if not properly controlled through filtering.

Other approaches are based on inductive coupling between a transmit antenna embedded, for example, in a "charging" mat or surface and a receive antenna plus rectifying circuit embedded in the host device to be charged. This approach has the disadvantage that the spacing between transmit and receive antennas must be very close (e.g. mms). Though this approach may have the capability to simultaneously charge multiple devices in the same area, this area is typically small, hence the user must locate the devices to a specific area.

A need exists for devices configured for determining a schedule for transmission of wireless power to multiple chargeable devices. More specifically, a need exists for devices configured for determining a schedule for transmission of wireless power from a wireless charger to multiple chargeable devices based upon one or more charging attributes associated with the chargeable devices, the wireless charger, or both.

DETAILED DESCRIPTION

The word "exemplary" is used herein to mean "serving as an example, instance, or illustration." Any embodiment described herein as "exemplary" is not necessarily to be construed as preferred or advantageous over other embodiments.

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

The words "wireless power" is used herein to mean any form of energy associated with electric fields, magnetic fields, electromagnetic fields, or otherwise that is transmitted between from a transmitter to a receiver without the use of physical electromagnetic conductors.

Figure 1:
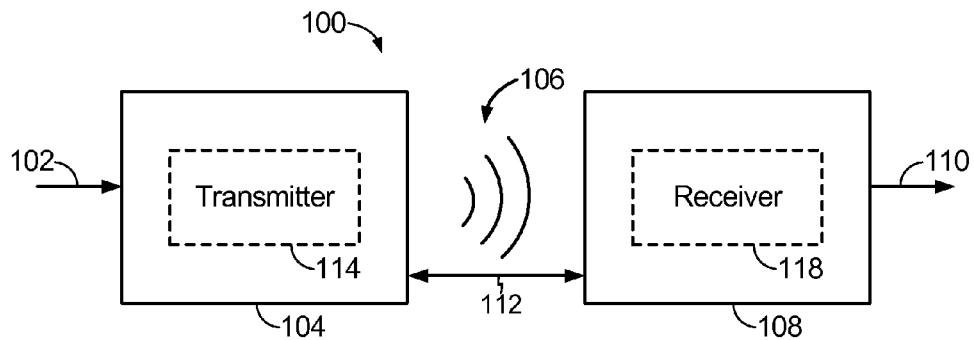
FIG. 1 shows a simplified block diagram of a wireless power transmission system.

FIG. 1 illustrates a wireless transmission or charging system 100, in accordance with various exemplary embodiments of the present invention. Input power 102 is provided to a transmitter 104 for generating a radiated field 106 for providing energy transfer. A receiver 108 couples to the radiated field 106 and generates an output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship and when the resonant frequency of receiver 108 and the resonant frequency of transmitter 104 are very close, transmission losses between the transmitter 104 and the receiver 108 are minimal when the receiver 108 is located in the "near-field" of the radiated field 106.

Transmitter 104 further includes a transmit antenna 114 for providing a means for energy transmission and receiver 108 further includes a receive antenna 118 for providing a means for energy reception. The transmit and receive antennas are sized according to applications and devices to be associated therewith. As stated, an efficient energy transfer occurs by coupling a large portion of the energy in the near-field of the transmitting antenna to a receiving antenna rather than propagating most of the energy in an electromagnetic wave to the far field. When in this near-field a coupling mode may be developed between the transmit antenna 114 and the receive antenna 118. The area around the antennas 114 and 118 where this near-field coupling may occur is referred to herein as a coupling-mode region.

Figure 2:
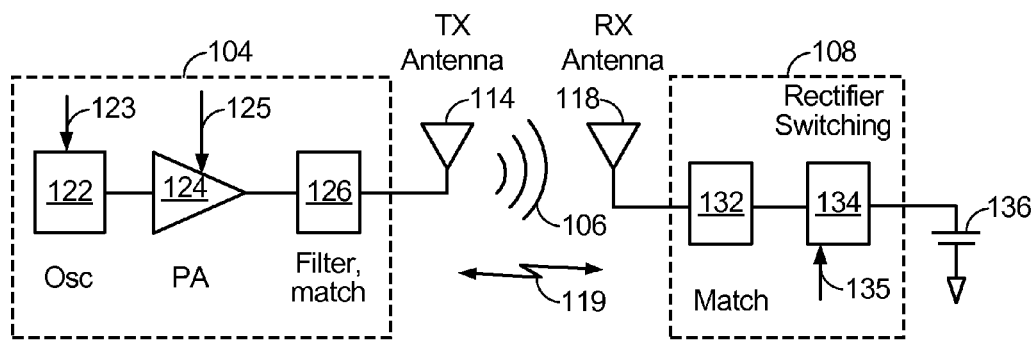
FIG. 2 shows a simplified schematic diagram of a wireless power transmission system.

FIG. 2 shows a simplified schematic diagram of a wireless power transfer system. The transmitter 104 includes an oscillator 122, a power amplifier 124 and a filter and matching circuit 126. The oscillator is configured to generate a signal at a desired frequency, which may be adjusted in response to adjustment signal 123. The oscillator signal may be amplified by the power amplifier 124 with an amplification amount responsive to control signal 125. The filter and matching circuit 126 may be included to filter out harmonics or other unwanted frequencies and match the impedance of the transmitter 104 to the transmit antenna 114.

The receiver 108 may include a matching circuit 132 and a rectifier and switching circuit 134 to generate a DC power output to charge a battery 136 as shown in FIG. 2 or power a device coupled to the receiver (not shown). The matching circuit 132 may be included to match the impedance of the receiver 108 to the receive antenna 118. The receiver 108 and transmitter 104 may communicate on a separate communication channel 119 (e.g., Bluetooth, zigbee, cellular, etc).

Figure 3:
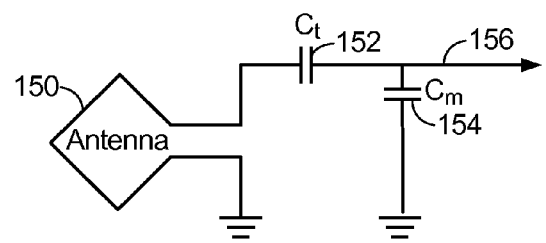
FIG. 3 shows a schematic diagram of a loop antenna for use in exemplary embodiments of the present invention.

As illustrated in FIG. 3, antennas used in exemplary embodiments may be configured as a "loop" antenna 150, which may also be referred to herein as a "magnetic" antenna. Loop antennas may be configured to include an air core or a physical core such as a ferrite core. Air core loop antennas may be more tolerable to extraneous physical devices placed in the vicinity of the core. Furthermore, an air core loop antenna allows the placement of other components within the core area. In addition, an air core loop may more readily enable placement of the receive antenna 118 (FIG. 2) within a plane of the transmit antenna 114 (FIG. 2) where the coupled-mode region of the transmit antenna 114 (FIG. 2) may be more powerful.

As stated, efficient transfer of energy between the transmitter 104 and receiver 108 occurs during matched or nearly matched resonance between the transmitter 104 and the receiver 108. However, even when resonance between the transmitter 104 and receiver 108 are not matched, energy may be transferred at a lower efficiency. Transfer of energy occurs by coupling energy from the near-field of the transmitting antenna to the receiving antenna residing in the neighborhood where this near-field is established rather than propagating the energy from the transmitting antenna into free space.

The resonant frequency of the loop or magnetic antennas is based on the inductance and capacitance. Inductance in a loop antenna is generally simply the inductance created by the loop, whereas, capacitance is generally added to the loop antenna's inductance to create a resonant structure at a desired resonant frequency. As a non-limiting example, capacitor 152 and capacitor 154 may be added to the antenna to create a resonant circuit that generates resonant signal 156. Accordingly, for larger diameter loop antennas, the size of capacitance needed to induce resonance decreases as the diameter or inductance of the loop increases. Furthermore, as the diameter of the loop or magnetic antenna increases, the efficient energy transfer area of the near-field increases. Of course, other resonant circuits are possible. As another non-limiting example, a capacitor may be placed in parallel between the two terminals of the loop antenna. In addition, those of ordinary skill in the art will recognize that for transmit antennas the resonant signal 156 may be an input to the loop antenna 150.

Exemplary embodiments of the invention include coupling power between two antennas that are in the near-fields of each other. As stated, the near-field is an area around the antenna in which electromagnetic fields exist but may not propagate or radiate away from the antenna. They are typically confined to a volume that is near the physical volume of the antenna. In the exemplary embodiments of the invention, magnetic type antennas such as single and multi-turn loop antennas are used for both transmit (Tx) and receive (Rx) antenna systems since magnetic near-field amplitudes tend to be higher for magnetic type antennas in comparison to the electric near-fields of an electric-type antenna (e.g., a small dipole). This allows for potentially higher coupling between the pair. Furthermore, "electric" antennas (e.g., dipoles and monopoles) or a combination of magnetic and electric antennas is also contemplated.

The Tx antenna can be operated at a frequency that is low enough and with an antenna size that is large enough to achieve good coupling (e.g., >−4 dB) to a small Rx antenna at significantly larger distances than allowed by far field and inductive approaches mentioned earlier. If the Tx antenna is sized correctly, high coupling levels (e.g., −2 to −4 dB) can be achieved when the Rx antenna on a host device is placed within a coupling-mode region (i.e., in the near-field) of the driven Tx loop antenna.

Figure 4:
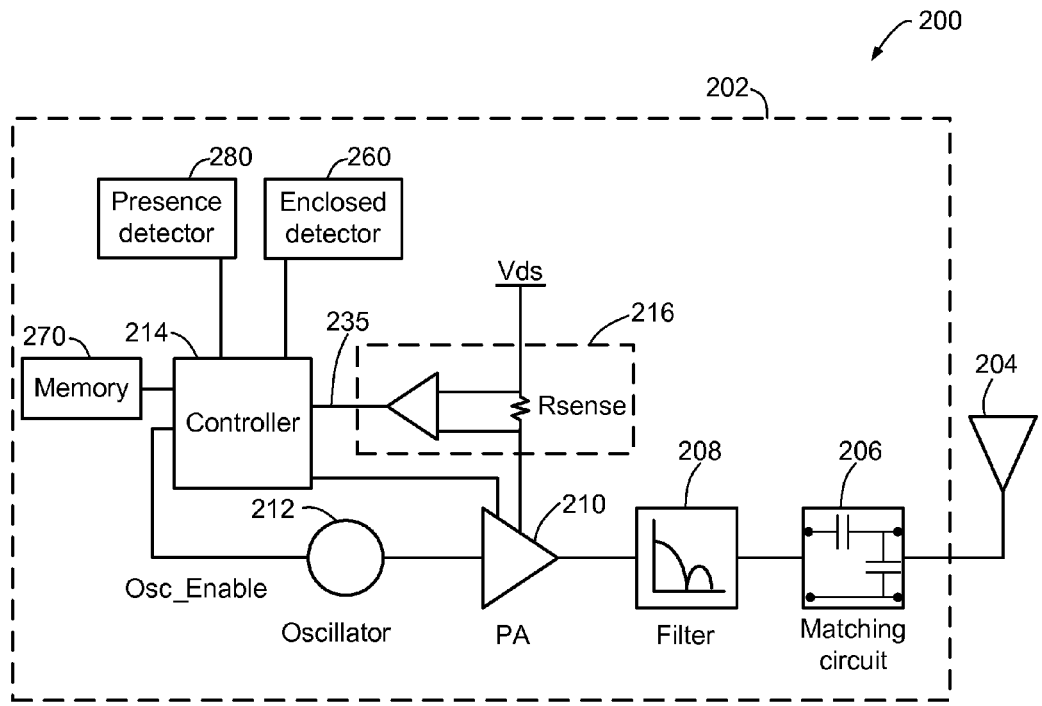
FIG. 4 is a simplified block diagram of a transmitter, in accordance with an exemplary embodiment of the present invention.

FIG. 4 is a simplified block diagram of a transmitter 200, in accordance with an exemplary embodiment of the present invention. The transmitter 200 includes transmit circuitry 202 and a transmit antenna 204. Generally, transmit circuitry 202 provides RF power to the transmit antenna 204 by providing an oscillating signal resulting in generation of near-field energy about the transmit antenna 204. By way of example, transmitter 200 may operate at the 13.56 MHz ISM band.

Exemplary transmit circuitry 202 includes a fixed impedance matching circuit 206 for matching the impedance of the transmit circuitry 202 (e.g., 50 ohms) to the transmit antenna 204 and a low pass filter (LPF) 208 configured to reduce harmonic emissions to levels to prevent self-jamming of devices coupled to receivers 108 (FIG. 1). Other exemplary embodiments may include different filter topologies, including but not limited to, notch filters that attenuate specific frequencies while passing others and may include an adaptive impedance match, that can be varied based on measurable transmit metrics, such as output power to the antenna or DC current draw by the power amplifier. Transmit circuitry 202 further includes a power amplifier 210 configured to drive an RF signal as determined by an oscillator 212. The transmit circuitry may be comprised of discrete devices or circuits, or alternately, may be comprised of an integrated assembly. An exemplary RF power output from transmit antenna 204 may be on the order of 2.5 Watts.

Transmit circuitry 202 further includes a controller 214 for enabling the oscillator 212 during transmit phases (or duty cycles) for specific receivers, for adjusting the frequency of the oscillator, and for adjusting the output power level for implementing a communication protocol for interacting with neighboring devices through their attached receivers.

The transmit circuitry 202 may further include a load sensing circuit 216 for detecting the presence or absence of active receivers in the vicinity of the near-field generated by transmit antenna 204. By way of example, a load sensing circuit 216 monitors the current flowing to the power amplifier 210, which is affected by the presence or absence of active receivers in the vicinity of the near-field generated by transmit antenna 204. Detection of changes to the loading on the power amplifier 210 are monitored by controller 214 for use in determining whether to enable the oscillator 212 for transmitting energy to communicate with an active receiver.

Transmit antenna 204 may be implemented as an antenna strip with the thickness, width and metal type selected to keep resistive losses low. In a conventional implementation, the transmit antenna 204 can generally be configured for association with a larger structure such as a table, mat, lamp or other less portable configuration. Accordingly, the transmit antenna 204 generally will not need "turns" in order to be of a practical dimension. An exemplary implementation of a transmit antenna 204 may be "electrically small" (i.e., fraction of the wavelength) and tuned to resonate at lower usable frequencies by using capacitors to define the resonant frequency. In an exemplary application where the transmit antenna 204 may be larger in diameter, or length of side if a square loop, (e.g., 0.50 meters) relative to the receive antenna, the transmit antenna 204 will not necessarily need a large number of turns to obtain a reasonable capacitance.

The transmitter 200 may gather and track information about the whereabouts and status of receiver devices that may be associated with the transmitter 200. Thus, the transmitter circuitry 202 may include a presence detector 280, an enclosed detector 290, or a combination thereof, connected to the controller 214 (also referred to as a processor herein). The controller 214 may adjust an amount of power delivered by the amplifier 210 in response to presence signals from the presence detector 280 and the enclosed detector 290. The transmitter may receive power through a number of power sources, such as, for example, an AC-DC converter (not shown) to convert conventional AC power present in a building, a DC-DC converter (not shown) to convert a conventional DC power source to a voltage suitable for the transmitter 200, or directly from a conventional DC power source (not shown).

Figure 5:
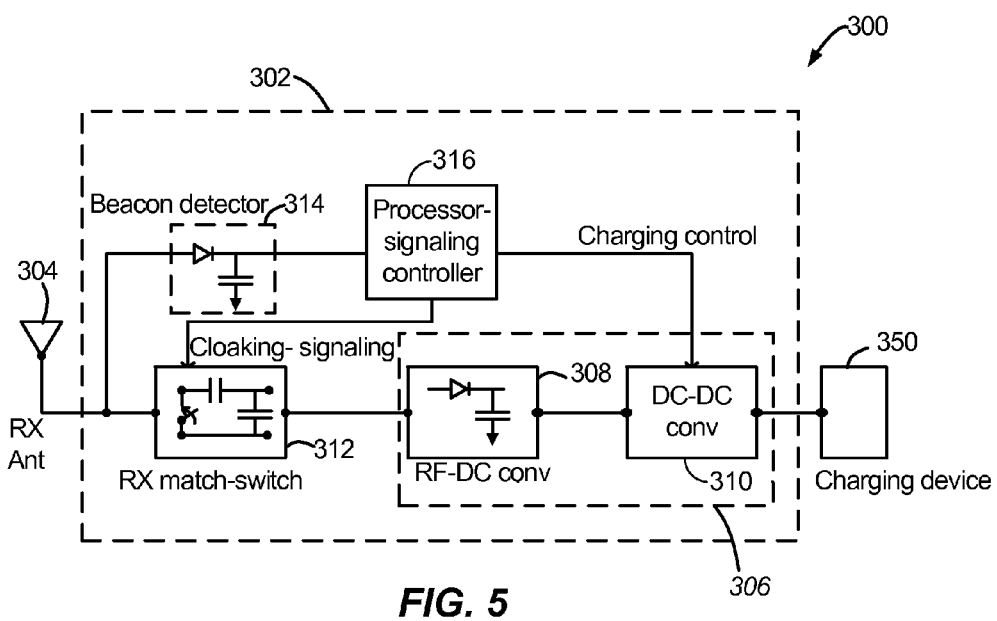
FIG. 5 is a simplified block diagram of a receiver, in accordance with an exemplary embodiment of the present invention.

FIG. 5 is a simplified block diagram of a receiver 300, in accordance with an exemplary embodiment of the present invention. The receiver 300 includes receive circuitry 302 and a receive antenna 304. Receiver 300 further couples to device 350 for providing received power thereto. It should be noted that receiver 300 is illustrated as being external to device 350 but may be integrated into device 350. Generally, energy is propagated wirelessly to receive antenna 304 and then coupled through receive circuitry 302 to device 350.

Receive antenna 304 is tuned to resonate at the same frequency, or near the same frequency, as transmit antenna 204 (FIG. 4). Receive antenna 304 may be similarly dimensioned with transmit antenna 204 or may be differently sized based upon the dimensions of the associated device 350. By way of example, device 350 may be a portable electronic device having diametric or length dimension smaller that the diameter of length of transmit antenna 204. In such an example, receive antenna 304 may be implemented as a multi-turn antenna in order to reduce the capacitance value of a tuning capacitor (not shown) and increase the receive antenna's impedance. By way of example, receive antenna 304 may be placed around the substantial circumference of device 350 in order to maximize the antenna diameter and reduce the number of loop turns (i.e., windings) of the receive antenna and the inter-winding capacitance.

Receive circuitry 302 provides an impedance match to the receive antenna 304.

Receive circuitry 302 includes power conversion circuitry 306 for converting a received RF energy source into charging power for use by device 350. Power conversion circuitry 306 includes an RF-to-DC converter 308 and may also in include a DC-to-DC converter 310. RF-to-DC converter 308 rectifies the RF energy signal received at receive antenna 304 into a non-alternating power while DC-to-DC converter 310 converts the rectified RF energy signal into an energy potential (e.g., voltage) that is compatible with device 350. Various RF-to-DC converters are contemplated, including partial and full rectifiers, regulators, bridges, doublers, as well as linear and switching converters.

Receive circuitry 302 may further include switching circuitry 312 for connecting receive antenna 304 to the power conversion circuitry 306 or alternatively for disconnecting the power conversion circuitry 306. Disconnecting receive antenna 304 from power conversion circuitry 306 not only suspends charging of device 350, but also changes the "load" as "seen" by the transmitter 200 (FIG. 2).

As disclosed above, transmitter 200 includes load sensing circuit 216 which detects fluctuations in the bias current provided to transmitter power amplifier 210. Accordingly, transmitter 200 has a mechanism for determining when receivers are present in the transmitter's near-field.

When multiple receivers 300 are present in a transmitter's near-field, it may be desirable to time-multiplex the loading and unloading of one or more receivers to enable other receivers to more efficiently couple to the transmitter. This "unloading" of a receiver is also known herein as a "cloaking " A receiver may also be cloaked in order to eliminate coupling to other nearby receivers or to reduce loading on nearby transmitters. Furthermore, this switching between unloading and loading as controlled by receiver 300 and detected by transmitter 200 provides a communication mechanism from receiver 300 to transmitter 200 as is explained more fully below. Additionally, a protocol can be associated with the switching which enables the sending of a message from receiver 300 to transmitter 200. By way of example, a switching speed may be on the order of 100 μsec.

In an exemplary embodiment, communication between the transmitter and the receiver refers to a device sensing and charging control mechanism, rather than conventional two-way communication. In other words, the transmitter uses, for example, on/off keying of the transmitted signal to adjust whether energy is available in the near-filed. The receivers interpret these changes in energy as a message from the transmitter. From the receiver side, the receiver uses tuning and de-tuning of the receive antenna to adjust how much power is being accepted from the near-field. The transmitter can detect this difference in power used from the near-field and interpret these changes as signal forming a message from the receiver.

Receive circuitry 302 may further include signaling detector and beacon circuitry 314 used to identify received energy fluctuations, which may correspond to informational signaling from the transmitter to the receiver. Furthermore, signaling and beacon circuitry 314 may also be used to detect the transmission of a reduced RF signal energy (i.e., a beacon signal) and to rectify the reduced RF signal energy into a nominal power for awakening either un-powered or power-depleted circuits within receive circuitry 302 in order to configure receive circuitry 302 for wireless charging.

Receive circuitry 302 further includes processor 316 for coordinating the processes of receiver 300 described herein including the control of switching circuitry 312 described herein. Cloaking of receiver 300 may also occur upon the occurrence of other events including detection of an external wired charging source (e.g., wall/USB power) providing charging power to device 350. Processor 316, in addition to controlling the cloaking of the receiver, may also monitor beacon circuitry 314 to determine a beacon state and extract messages sent from the transmitter. Processor 316 may also adjust DC-to-DC converter 310 for improved performance.

Figure 6:
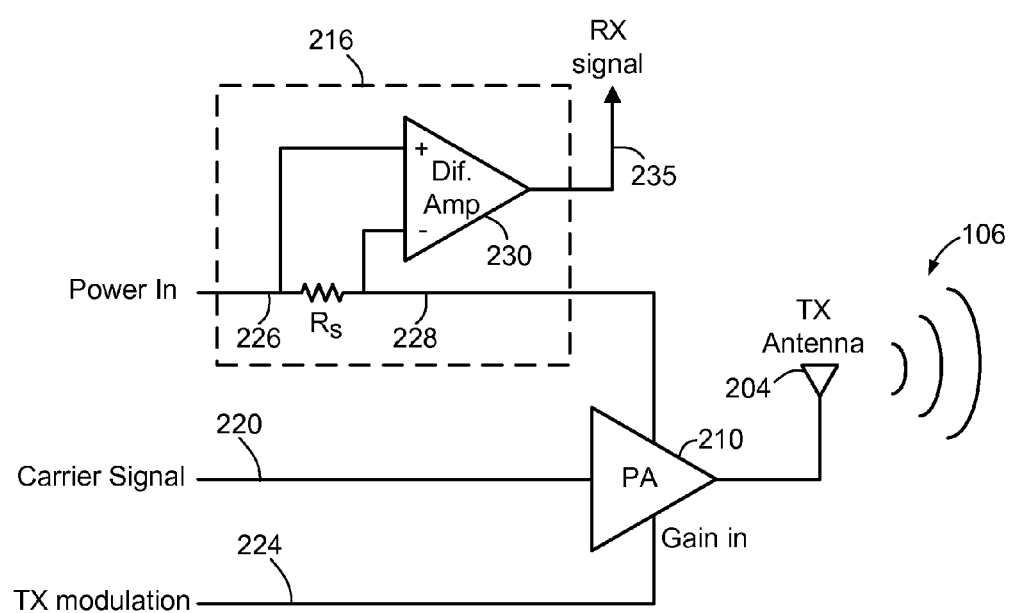
FIG. 6 shows a simplified schematic of a portion of transmit circuitry for carrying out messaging between a transmitter and a receiver.

FIG. 6 shows a simplified schematic of a portion of transmit circuitry for carrying out messaging between a transmitter and a receiver. In some exemplary embodiments of the present invention, a means for communication may be enabled between the transmitter and the receiver. In FIG. 6 a power amplifier 210 drives the transmit antenna 204 to generate the radiated field. The power amplifier is driven by a carrier signal 220 that is oscillating at a desired frequency for the transmit antenna 204. A transmit modulation signal 224 is used to control the output of the power amplifier 210.

The transmit circuitry can send signals to receivers by using an ON/OFF keying process on the power amplifier 210. In other words, when the transmit modulation signal 224 is asserted, the power amplifier 210 will drive the frequency of the carrier signal 220 out on the transmit antenna 204. When the transmit modulation signal 224 is deactivated, the power amplifier will not drive any signal on the transmit antenna 204.

The transmit circuitry of FIG. 6 also includes a load sensing circuit 216 that supplies power to the power amplifier 210 and generates a receive signal 235. In the load sensing circuit 216, a voltage drop across resistor $R_s$ develops between the power in signal 226 and the power supply 228 to the power amplifier 210. Any change in the power consumed by the power amplifier 210 will cause a change in the voltage drop that will be amplified by differential amplifier 230. When the transmit antenna is in coupled mode with a receive antenna in a receiver (not shown in FIG. 6) the amount of current drawn by the power amplifier 210 will change. In other words, if no coupled mode resonance exist for the transmit antenna 204, the power required to drive the radiated field will be a first amount. If a coupled mode resonance exists, the amount of power consumed by the power amplifier 210 will go up because much of the power is being coupled into the receive antenna. Thus, the receive signal 235 can indicate the presence of a receive antenna coupled to the transmit antenna 235 and can also detect signals sent from the receive antenna. Additionally, a change in receiver current draw will be observable in the transmitter's power amplifier current draw, and this change can be used to detect signals from the receive antennas.

Details of some exemplary embodiments for cloaking signals, beacon signals, and circuits for generating these signals can be seen in U.S. Utility patent application Ser. No. 12/249,873, entitled "REVERSE LINK SIGNALING VIA RECEIVE ANTENNA IMPEDANCE MODULATION" filed on Oct. 10, 2008; and in U.S. Utility patent application Ser. No. 12/249,861, entitled "TRANSMIT POWER CONTROL FOR A WIRELESS CHARGING SYSTEM" filed on Oct. 10, 2008, both herein incorporated by reference in their entirety.

Details of exemplary communication mechanisms and protocols can be seen in U.S. Utility patent application Ser. No. 12/249,866 entitled "SIGNALING CHARGING IN WIRELESS POWER ENVIRONMENT" filed on Oct. 10, 2008, the contents of which is incorporated by reference herein in its entirety.

Figure 7:
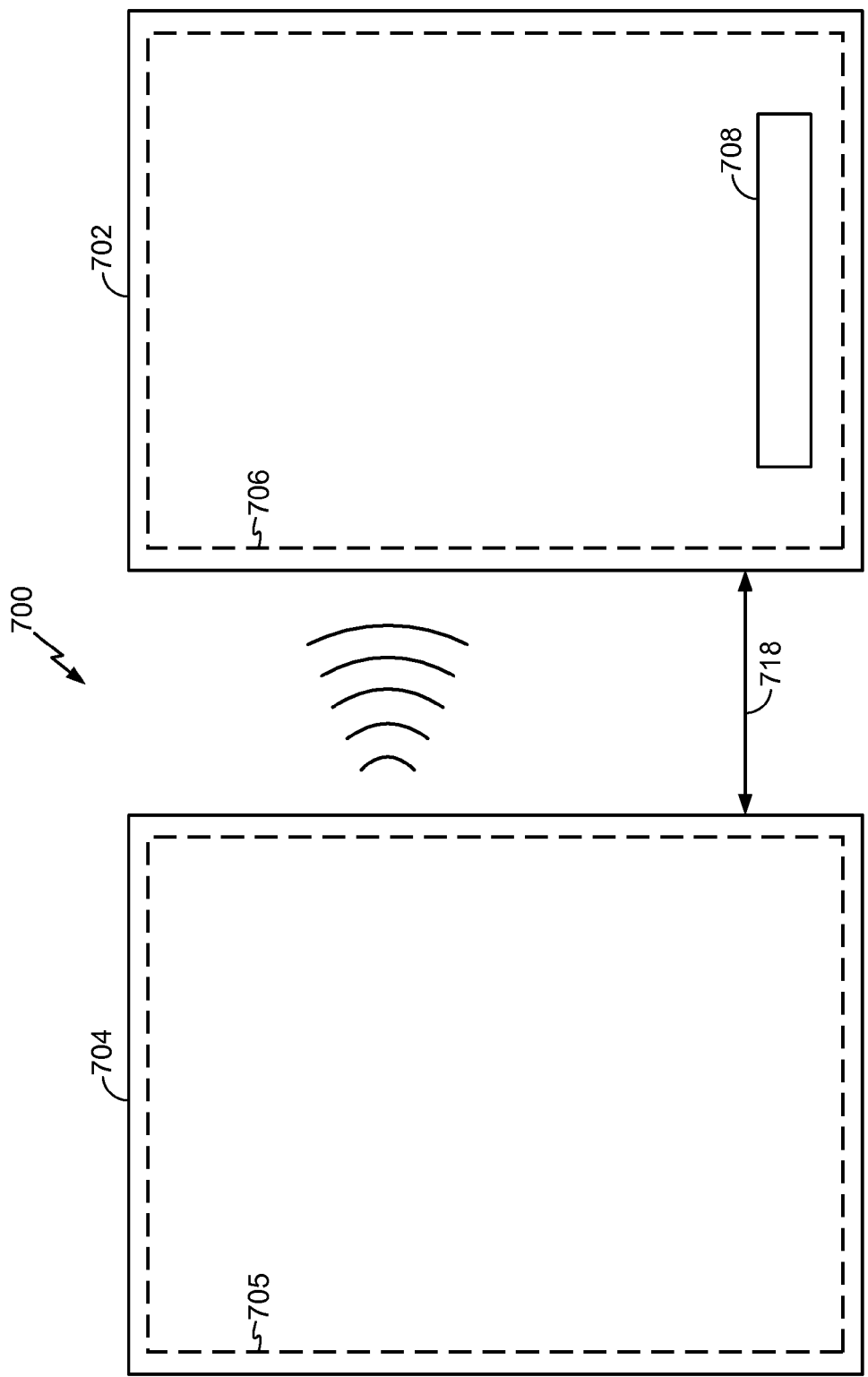
FIG. 7 illustrates a system including a chargeable device and a wireless charger, in accordance with an exemplary embodiment of the present invention.

FIG. 7 depicts a system 700 including at least one chargeable device 702 and a wireless charger 704, in accordance with an exemplary embodiment of the present invention. Chargeable device 702 may comprise any known and suitable chargeable device. As non-limiting examples, chargeable device 702 may comprise a cellular telephone, a portable media player, a camera, a gaming device, a navigation device, a headset (e.g., a Bluetooth headset), a tool, a toy, or any combination thereof. Chargeable device 702 may include at least one antenna 706, which may be configured to receive power wirelessly transmitted from a suitable wireless power source. More specifically, according to one exemplary embodiment, antenna 706 and an associated receiver, such as receiver 108 of FIG. 2, may be configured to receive wireless power transmitted from a wireless power source (e.g., wireless charger 704) positioned within an associated near-field region. Furthermore, chargeable device 702 may include a coil (not shown) and an associated receiver, such as receiver 108 of FIG. 2, which may be configured to receive wireless power transmitted from a wireless power source via inductive coupling. Additionally, chargeable device 702 may be configured to store received power within a battery 708 of chargeable device 702. Wireless charger 704 may include at least one transmit antenna 705 configured to wirelessly transmit power to at least one chargeable device (e.g., chargeable device 702). More specifically, transmit antenna 705 and an associated transmitter, such as transmitter 104 of FIG. 2, may be configured to transmit wireless power to a receiver within an associated near-field region.

Furthermore, each of chargeable device 702 and wireless charger 704 may be configured to wirelessly communicate with at least one other electronic device via associated antennas. More specifically, as an example, chargeable device 702 may be configured to establish a communication link with at least one other electronic device (e.g., wireless charger 704) and, upon establishing the communication link, may wirelessly receive data (e.g., audio files, data files, video files, or control signals) from the at least one other electronic device, wirelessly transmit data to the at least one other electronic device, or both. Similarly, wireless charger 704 may be configured to establish a communication link with at least one other electronic device (e.g., chargeable device 702) and, upon establishing the communication link, may wirelessly receive data (e.g., audio files, data files, video files, or control signals) from the at least one other electronic device, wirelessly transmit data to the at least one other electronic device, or both. As illustrated in FIG. 7, a wireless communication link 718 exists between chargeable device 702 and wireless charger 704.

Figure 8:
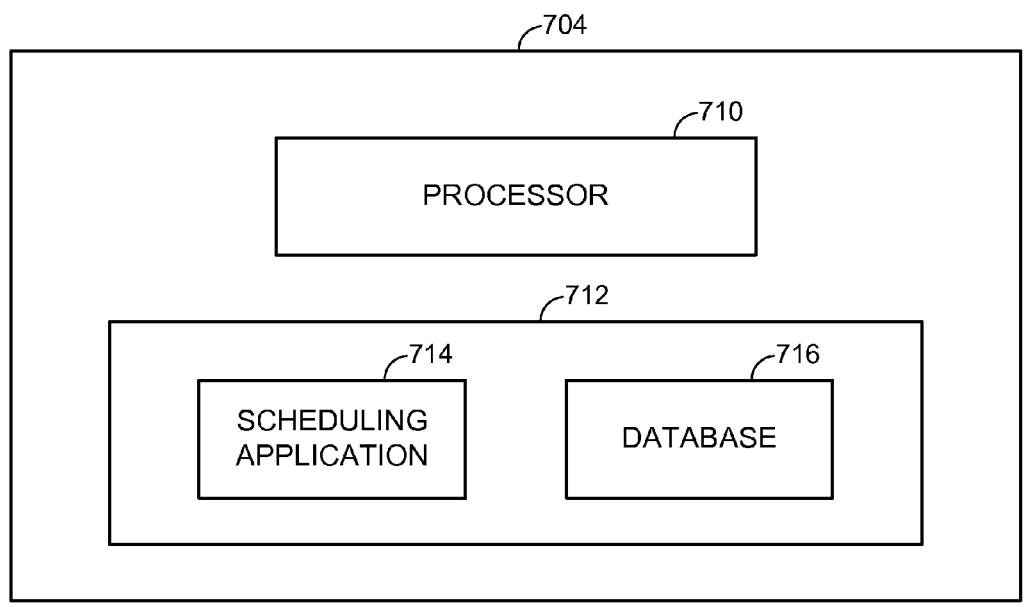
FIG. 8 is a block diagram of a wireless charger, according to an exemplary embodiment of the present invention.

FIG. 8 illustrates a block diagram of charger 704. As illustrated, charger 704 may include a processor 710 and memory 712. In accordance with one exemplary embodiment, memory 712 may include a scheduling application 714. Memory 712 may also include a database 716. In one exemplary embodiment, instructions implementing scheduling application 714 may be tangibly embodied in a computer-readable medium, which may include one or more fixed or removable data storage devices, such as a zip drive, a floppy disc drive, a hard drive, a CD-ROM drive, tape drive, flash memory device, etc. Further, scheduling application 714 may include instructions which, when read and executed by processor 710, may cause processor 710 to perform the steps necessary to implement and/or use embodiments of the present invention. Scheduling application 714 and/or operating instructions may also be tangibly embodied in memory 712 and/or data communications devices, thereby making a computer program product or article of manufacture according to an embodiment the invention. As such, the term "scheduling application" as used herein is intended to encompass a computer program accessible from any computer readable device or media.

Charging attributes, which may be used by wireless charger 704 in scheduling for transmission of wireless power, will now be described. In accordance with various exemplary embodiments of the present invention, charger 704, and more specifically, scheduling application 714, may be configured for utilizing data to schedule for transmission of wireless power to one or more chargeable devices positioned within an associated charging region. More specifically and, as described more fully below, to create a charging schedule, scheduling application 714 may be configured to use, for example, one or more attributes related to one or more chargeable devices positioned within an associated charging region, one or more environment attributes associated with charger 704, one or more defined priority attributes associated with one or more chargeable devices, one or more defined priority attributes associated with one or more chargeable device users, or any combination thereof. More specifically, as one example, scheduling application 714 may be configured to utilize one or more static attributes associated with one or more chargeable devices. Static attributes associated with a chargeable device may identify, for example only, the type of chargeable device (e.g., a cellular telephone), a model of the chargeable device (e.g. Motorola), and a user of a chargeable device. Furthermore, for example only, static attributes may identify a type of a battery (e.g., lithium ion) of a chargeable device, a model of a battery of a chargeable device, a charging capacity of a battery of a chargeable device, and a charging rate function of a battery of a chargeable device. Static attributes may also identify a desired charging period duration of a battery of a chargeable device and a desired time gap between consecutive charging periods of a battery of a chargeable device.

It is noted that a charging rate function of a battery may describe a relationship between a rate of charge (i.e., how fast the battery can be charged) and a charging state of a battery (i.e., the amount of charge stored in the battery). As will be understood by a person having ordinary skill in the art, a rate of charge of a battery may decrease as the amount of charge stored in the battery increases. Accordingly, as an amount of charge within a battery approaches a maximum level, the battery may require a lower rate of charging and, therefore, a charging time allocated to the battery may be decreased. It is further noted that a charging rate function of a battery may be dependent on an age of the battery, a temperature of the battery, or both.

In addition, as another example, scheduling application 714 may be configured to utilize one or more dynamic attributes associated with one or more chargeable devices positioned within an associated charging region for generating and implementing a charging schedule. Dynamic attributes may identify, for example only, a state of charge of a battery of a chargeable device, a temperature of a battery of a chargeable device, and an age of a battery of a chargeable device. Wireless charger 704 may further be adapted to utilize one or more configurable attributes in generating and implementing a charging schedule. Configurable attributes may identify, for example only, defined priority levels of one or more known chargeable device users, defined priority levels for one or more known chargeable devices, or any combination thereof. By way of example only, a cellular telephone may have an assigned charging priority level that is higher than a charging priority level assigned to a portable media player. Furthermore, for example, a first user (e.g., an adult) may have an assigned charging priority level that is higher than a charging priority level assigned to a second user (e.g., a child).

Furthermore, scheduling application 714 may be configured to utilize one or more environmental attributes associated with wireless charger 704 for generating and implementing a charging schedule for transmission of wireless power to one or more chargeable devices positioned within an associated charging region. For example only, an environmental attribute may identify the number of chargeable devices positioned within a charging region of wireless charger 704. As another example, an environmental attribute may identify interference patterns between two or more chargeable devices positioned within a charging region of wireless charger 704. It is noted that an interference pattern between two or more chargeable devices may depend on the types of chargeable devices, the types of batteries associated with the chargeable device, relative locations and/or orientations of the chargeable devices, or any combination thereof.

As described more fully below, attributes (i.e., static attributes, dynamic attributes, configurable attributes, and environmental attributes), which may be utilized in determining a charging schedule, may be stored within charger 704 (i.e., within database 716), may be conveyed to wireless charger 704 from one or more chargeable devices, may be retrieved from a remote database, may be derived by wireless charger 704 from other received attributes (i.e., attributes conveyed from one or more chargeable devices and/or attributes retrieved from a network), or any combination thereof.

Figure 9:
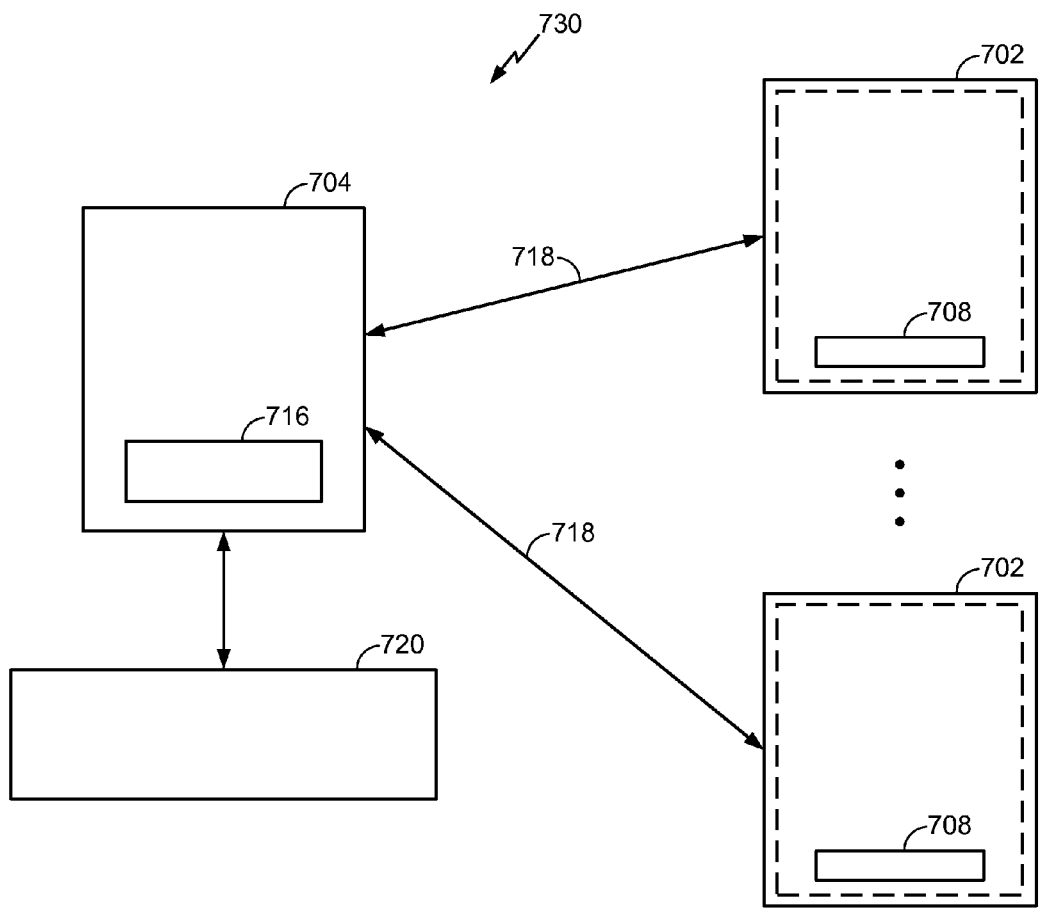
FIG. 9 illustrates a system including a wireless charger, a plurality of chargeable devices, and a remote database, in accordance with an exemplary embodiment of the present invention.

FIG. 9 illustrates a system 730 including wireless charger 704, a plurality of chargeable devices 702 positioned within a charging region of wireless charger 704, and a remote database 720. In accordance with various exemplary embodiments, methods of obtaining charging attributes at wireless charger 704 will now be described. According to one exemplary embodiment, wireless charger 704 may be configured to wirelessly receive data (i.e., one or more attributes) from chargeable device 702 relating to one or more characteristics of chargeable device 702, one or more characteristics of a battery 708, or any combination thereof. For example only, after being positioned within an associated charging region of wireless charger 704, chargeable device 702 may wirelessly transmit, via communication link 718, one or more static attributes related thereto, one or more dynamic attributes related thereto, one or more configurable attributes related thereto, or any combination thereof, to wireless charger 704.

Furthermore, according to one exemplary embodiment, wireless charger 704 may be configured to retrieve data (i.e., one or more attributes) relating to one or more characteristics of chargeable device 702, one or more characteristics of battery 708, or any combination thereof. For example, upon detecting chargeable device 702, wireless charger 704 may be configured to retrieve associated attributes from chargeable device 702. As another example, upon chargeable device 702 being positioned within an associated charging region, wireless charger 704 may be configured to receive an attribute from chargeable device 702 identifying a model type of chargeable device 702. Moreover, upon receiving the attribute identifying the model type, wireless charger 704 may be configured to retrieve static attributes related to the model type from chargeable device 702, remote database 720, database 716, or a combination thereof. As mentioned above, static attributes related to a chargeable device may identify, for example, the type of chargeable device (e.g., a cellular telephone) or an identity of a user of the chargeable device. Furthermore, wireless charger 704 may be configured to retrieve static attributes related to battery 708 from remote database 720, database 716, chargeable device 702, or a combination thereof. As mentioned above, static attributes associated with a battery may indentify a type of the battery (e.g., lithium ion), a model of the battery, a charging capacity of the battery, a charging rate function of the battery, a desired charging period duration of the battery, a desired time gap between consecutive charging periods of the battery, and a charging rate function of the battery with respect to temperature. Wireless charger 704 may further be configured to retrieve dynamic attributes from chargeable device 702 and associated therewith, prior to, or while providing wireless power to chargeable device 702. Moreover, wireless charger 704 may be configured to retrieve configurable attributes associated with chargeable device 702 from remote database 720, chargeable device 702, database 716, or a combination thereof.

According to another exemplary embodiment, wireless charger 704 and, more specifically, database 716 may be configured to store data (i.e., attributes) relating to one or more characteristics of chargeable device 702, one or more characteristics of battery 708, or any combination thereof. By way of example only, database 716 may be configured to store static attributes relating to chargeable device 702, static attributes relating to battery 708, dynamic attributes relating to battery 708, or any combination thereof. Moreover, database 716 may be configured to store configurable attributes, such as, for example only, defined priority levels of one or more known users, defined priority levels for one or more known chargeable devices, or any combination thereof. Database 716 may further be configured to store data related to environmental attributes such as, for example only, the number of chargeable devices positioned within a charging region of wireless charger 704, or interference patterns between two or more chargeable devices positioned within a charging region of wireless charger 704.

Furthermore, in accordance with another exemplary embodiment, wireless charger 704 may be configured to derive data (i.e., attributes) relating to one or more characteristics of chargeable device types, one or more characteristics of battery types, or any combination thereof, based on other known attributes. For example only, upon receipt of an attribute identifying a model of a battery, wireless charger 704 may be configured to determine one or more static attributes of the battery, such as, for example only, the battery capacity or the charging rate function of the battery. As another example, wireless charger 704 may be configured to estimate a current state of charge of a battery of a chargeable device based on an initial state of charge of the battery, a charging rate of the battery, and the elapsed charging duration. Wireless charger 704 may also be configured to derive one or more environmental attributes by, for example, sensing a number of chargeable devices positioned within an associated charging region, sensing interference patterns between two or more chargeable devices, or any combination thereof With reference to FIG. 9, various contemplated examples of methods of obtaining attributes at wireless charger 704 will now be described. As one example, upon detecting chargeable device 702, wireless charger 704 may be configured to retrieve available static attributes, dynamic attributes, and configurable attributes from chargeable device 702. As another example, upon being positioned within a charging region of wireless charger 704, chargeable device 702 may convey one or more static attributes to wireless charger 704 prior to receiving a charge therefrom. Furthermore, at any time before receiving wireless power or while receiving wireless power, each chargeable device 702 may convey one or more dynamic attributes to wireless charger 704. It is noted that dynamic attributes may change during a charging process and, therefore, each chargeable device 702 may be configured to send one or more dynamic attributes to wireless charger 704 on a regular basis or as needed during the charging process. Accordingly, it is noted that scheduling application 714 may be configured to update a charging schedule at anytime during a charging process.

According to another embodiment, upon being positioned within a charging region of wireless charger 704, chargeable device 702 may convey a key static attribute (e.g., an attribute identifying the model of battery 708) to wireless charger 704 prior to receiving a charge therefrom. Thereafter, based on the key attribute, wireless charger 704 may be configured to retrieve one or more other static attributes associated with chargeable device 702 and stored within database 716. In yet another exemplary embodiment, based on the key attribute, wireless charger 704 may be configured retrieve one or more other static attributes, which are associated with chargeable device 702, from remote database 720. Furthermore, in one exemplary embodiment, wireless charger 704 may be configured to attempt to retrieve one or more static attributes within database 716 and, if at least one attribute of the one or more static attributes is not found within database 716, wireless charger 704 may attempt to retrieve the at least one static attribute from remote database 720.

In addition, after being positioned within a charging region of wireless charger 704, chargeable device 702 may convey one or more configurable attributes to wireless charger 704. For example, after being positioned within a charging region of wireless charger 704, chargeable device 702 may convey its priority level to wireless charger. Further, wireless charger 704 may be configured to derive one or more configurable attributes locally, or attempt to retrieve one or more configurable attributes from remote database 720 based on one or more other attributes, such as, a device type, a device identity, or a user identity.

Figure 10:
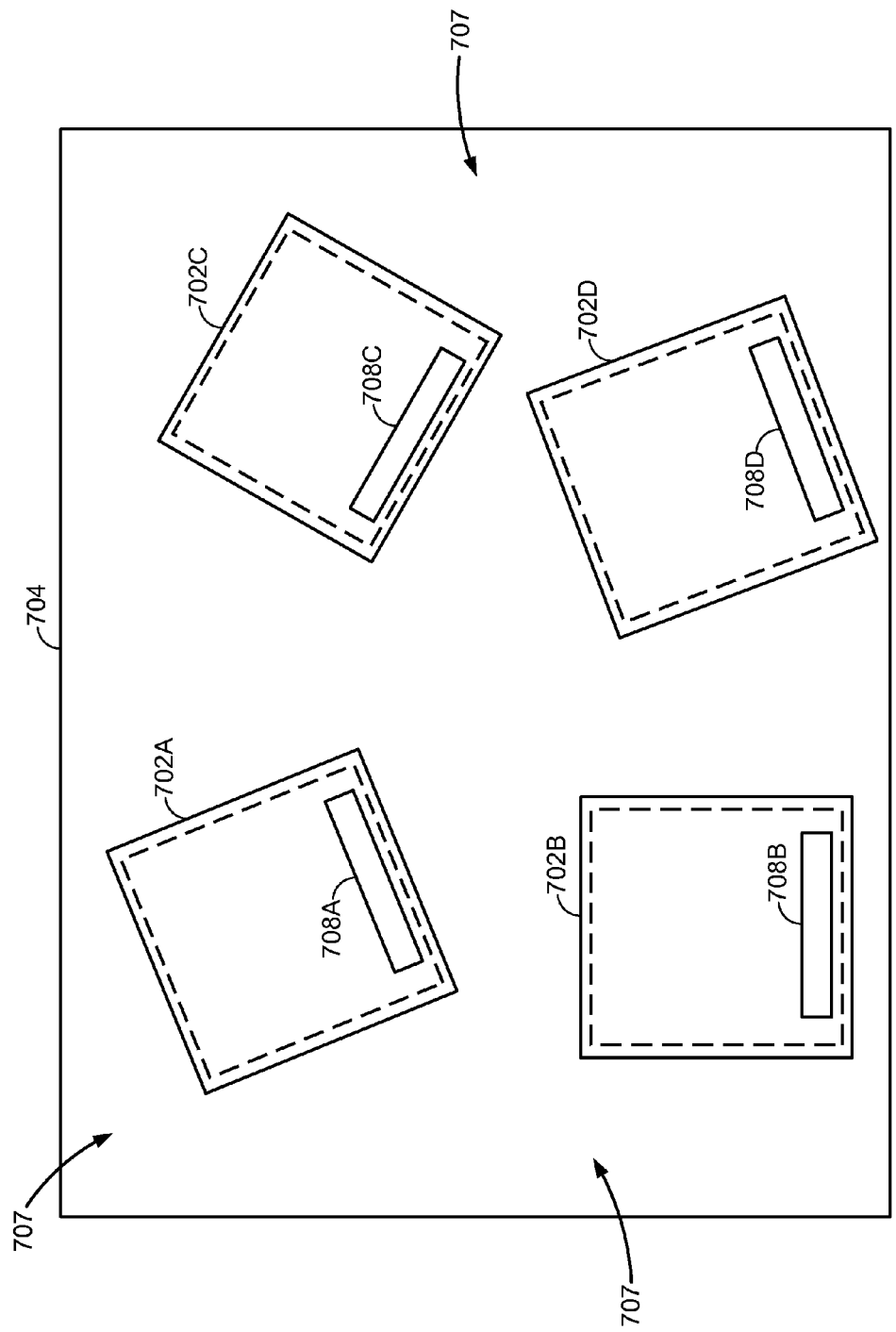
FIG. 10 illustrates a wireless charger and a plurality of chargeable devices, according to an exemplary embodiment of the present invention.

FIG. 10 illustrates wireless charger 704 and a plurality of chargeable devices 702A-D positioned within a charging region 707 of wireless charger 704. With reference to FIG. 10, various exemplary embodiments of scheduling for transmission of wireless power from wireless charger 704 to one or more chargeable devices 702A-D will now be described. According to various exemplary embodiments, a wireless power transmission schedule may be based on a time-domain based sequence wherein time slots may be allocated for charging one or more chargeable devices. It is noted that for each allocated charging time slot, wireless charger 704 may wirelessly convey power to one or more chargeable devices. It is further noted that chargeable devices may be "cloaked" during time slots in which they are not scheduled to receive wireless power.

In one exemplary embodiment, scheduling application 714 (see FIG. 8) may be configured to schedule for transmission of wireless power to each chargeable device 702A-D in a "round robin" approach. Accordingly, each chargeable device 702A-D may receive power for equal durations of time. In another exemplary embodiment, scheduling application 714 (see FIG. 8) may be configured to determine an order in which to charge chargeable devices 702A-D and, furthermore, may determine a charging time duration for each chargeable device 702A-D. More specifically, scheduling application 714 may determine an order in which to charge chargeable devices 702A-D and/or a charging time duration for each chargeable device 702A-D based on one or more static attributes associated with one or more of chargeable devices 702A-D, one or more dynamic attributes associated with one or more of chargeable devices 702A-D, one or more configurable attributes associated with one or more of chargeable devices 702A-D, one or more environmental attributes associated with wireless charger 704, or any combination thereof.

More specifically, for example, scheduling application 714 (see FIG. 8) may be configured to determine an order in which to charge chargeable devices 704A-D and/or charging time durations for each chargeable device 704A-D according to weighted factors assigned to each chargeable device. For example only, a weighted factor assigned to a chargeable device may be based on a device priority associated with the chargeable device, a user priority associated with the chargeable device, a charging rate of the chargeable device, a time duration required for the chargeable device to reach a maximum charge, or any combination thereof.

A contemplated example of determining an order in which to charge chargeable devices 704A-D and/or charging time durations for each chargeable device 704A-D according to weighted factors will now be described. In this example, it is assumed that chargeable device 704A has a "high" user priority, chargeable device 704B has a "medium" user priority, and chargeable device 704A and chargeable device 704D each have "low" user priorities. Accordingly, for a total charging during of time T, scheduling application 714 may be configured to schedule chargeable device 704A to receive wireless power first, and for a time duration of T/2. Furthermore, scheduling application 714 may be configured to schedule chargeable device 704B to receive wireless power second, and for a time duration of T/4. Moreover, scheduling application 714 may be configured to schedule each of chargeable device 704C and chargeable device 704D to receive wireless for a time duration of T/8. It is noted that, in this example, an order of providing wireless power to each of chargeable device 704C and chargeable device 704D may be determined by one or more other attributes of chargeable device 704C and chargeable device 704D (e.g., charging rates or device priorities), or wireless power may be provided to each of chargeable device 704C and chargeable device 704D in a random, "round robin" approach. It is noted that a weighted factor assigned to a chargeable device may be dependent on one or more attributes associated with the chargeable device.

In another exemplary embodiment, scheduling application 714 may determine an order in which to charge chargeable devices 704A-D according to priority levels assigned to each chargeable device 704A-D. Priority levels assigned to each chargeable device 704A-D may be dependent on device priorities (e.g., a cellular telephone, which has a higher device priority than a toy, may be charged prior to the toy), user priorities (e.g., an adult's cellular telephone, which has a higher user priority than a child's cellular telephone, may be charged prior to the child's cellular telephone), charging efficiencies (e.g., chargeable devices having a higher charging efficiency would be charged before chargeable devices having lower charging efficiencies), charging time durations for maximum charge (e.g., a chargeable device that requires a longer time charging duration to reach a maximum charge may be charged before a chargeable device that requires a shorter time charging duration to reach a maximum charge), charging levels (e.g., a chargeable device that is 20% charged may be charged before a chargeable device that is 80% charged). Moreover, according to one exemplary embodiment, scheduling application 714 may be configured to assign as much charging time as possible to higher priority chargeable devices before assigning charging time to lower priority chargeable devices.

A contemplated example of determining an order in which to charge chargeable devices 704A-D according to priority levels assigned to each chargeable device 704A-D will now be described. In this example, it is assumed that chargeable device 704A has a device priority level higher than chargeable device 704B, chargeable device 704B has a device priority level higher than chargeable device 704C, and chargeable device 704C has a device priority level higher than chargeable device 704D. Accordingly, scheduling application 714 may schedule to convey wireless power to chargeable device 704A during a first time slot and for a time duration required to reach a threshold charge (e.g., full charge), convey wireless power to chargeable device 704B during a second time slot and for a time duration required to reach a threshold charge, convey wireless power to chargeable device 704C during a third time slot and for a time duration required to reach a threshold charge, and convey wireless power to chargeable device 704D during a fourth time slot and for a time duration required to reach a threshold charge.

A contemplated example of determining an order in which to charge chargeable devices 704A-D according to priority levels assigned to each chargeable device 704A-D will now be described. In this example, it is assumed that chargeable device 704D has a higher charging rate than chargeable device 704C, chargeable device 704C has a higher charging rate than chargeable device 704B, and chargeable device 704B has a higher charging rate than chargeable device 704A. Accordingly, scheduling application 714 may schedule to convey wireless power to chargeable device 704D during a first time slot, convey wireless power to chargeable device 704C during a second time slot, convey wireless power to chargeable device 704B during a third time slot, and convey wireless power to chargeable device 704A during a fourth time slot.

Furthermore, it is noted that scheduling application 714 may be configured to determine a schedule for providing wireless power based on a plurality of priority level designations (e.g., device priority levels and charging rates), a plurality of weighted factor designations, or any combination thereof. For example, two chargeable devices 702 having equal user priority levels may be provided power in an order based on charging rates. As another example, two chargeable devices 702 including batteries having equal priority levels may be provided power according to a round robin approach or a weighted factor designation. Moreover, scheduling application 714 may be configured to schedule for transmission of wireless power simultaneously to a plurality of chargeable devices based on environmental attributes, such as interference patterns between two or more devices positioned within a charging region of wireless charger 704.

Figure 11:
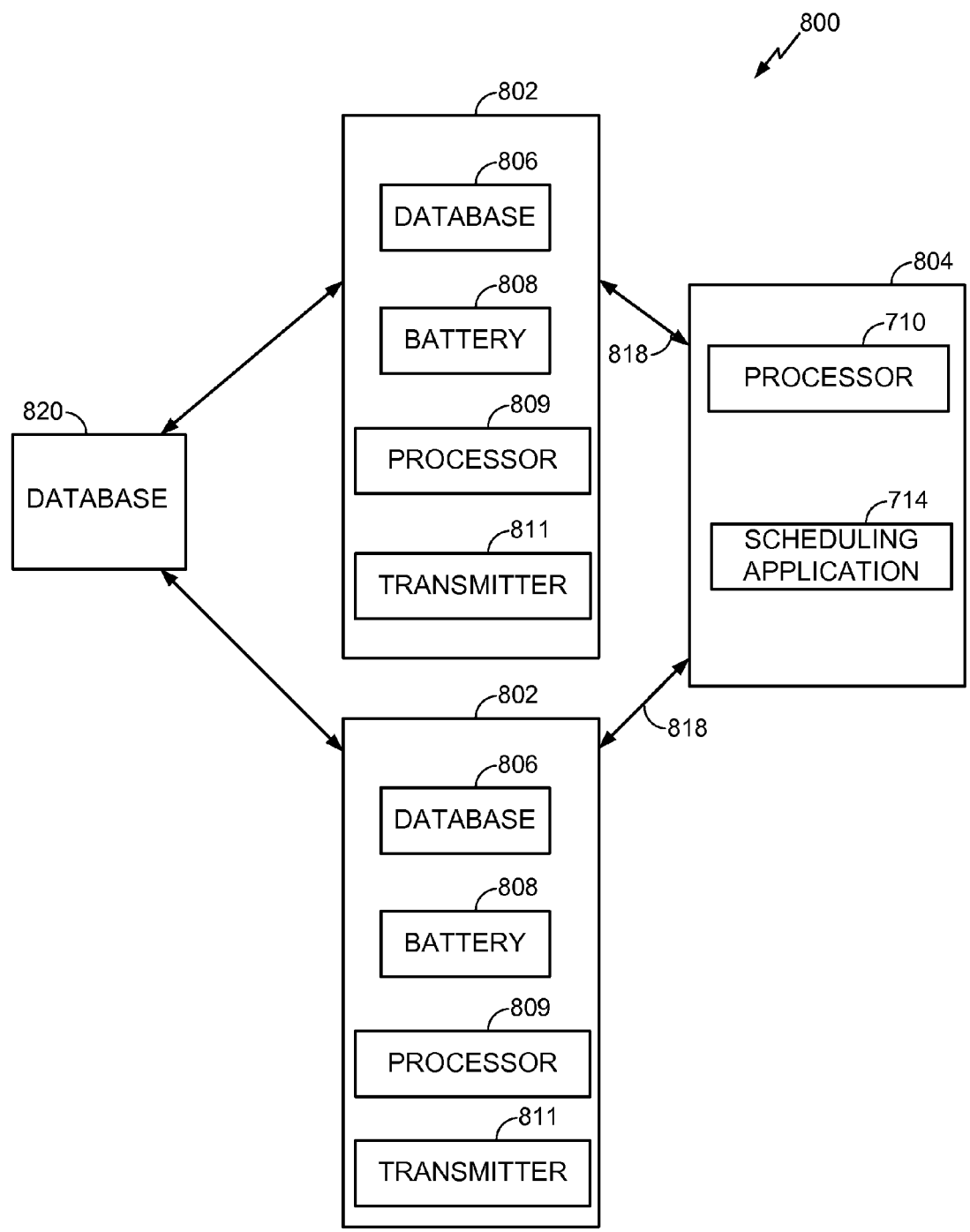
FIG. 11 illustrates another system including a wireless charger, a plurality of chargeable devices, and a remote database, according to an exemplary embodiment of the present invention.

FIG. 11 illustrates a system 800 including a plurality of chargeable devices 802 and a wireless charger 804. Each chargeable device 802 includes a processor 809, a database 806, a transmitter 811, and a battery 808. In this illustrated embodiment, it is not required that wireless charger 804 obtain attributes related to each chargeable device 802. Rather, each chargeable device 802, and more specifically, processor 809, is configured to utilize attributes associated therewith and stored within associated database 806 to determine one or more desired associated charging parameters. For example only, a charging parameter may include a charging rate, a charging duration, or a combination thereof. It is noted that the desired charging parameters may chosen to optimize a charging process of chargeable device 802. Upon determining one or more desired associated charging parameters, chargeable device 802 may transmit, via transmitter 811, a charging request to wireless charger 804 via communication link 818. For example, a charging request may include a desired rate of charge and a maximum rate of charge. More specifically, in an example wherein battery 808 is close to a maximum charge, chargeable device 802 may transmit a signal, via communication link 818, to wireless charger 804 requesting infrequent short bursts of charge. A charging request may also include a time duration when the request is valid. Upon receipt of a charging request from each chargeable device 802 positioned within an associated charging region, wireless charger 804 may determine a charging schedule in accordance with one or more of the exemplary embodiments described herein. It is noted that wireless charger 804 may include processor 710 and scheduling application 714. Furthermore, it is noted that chargeable device 802 may be configured to access a remote database 820 to obtain up-to-date information (e.g., attributes) associated with battery 808.

Figure 12:
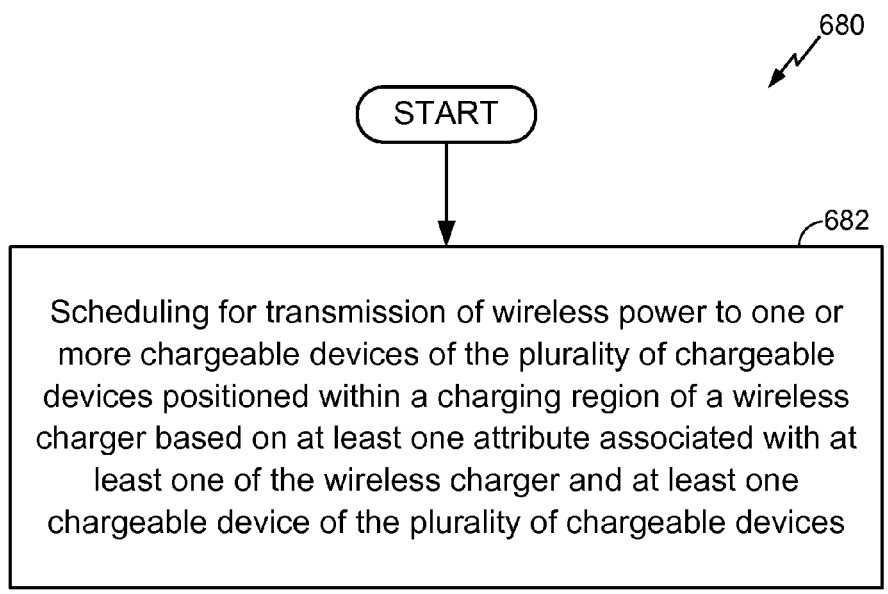
FIG. 12 is a flowchart illustrating a method, in accordance with an exemplary embodiment of the present invention.

FIG. 12 is a flowchart illustrating a method 680, in accordance with one or more exemplary embodiments. Method 680 may include scheduling for transmission of wireless power to one or more chargeable devices of the plurality of chargeable devices positioned within a charging region of a wireless charger based on at least attribute associated with at least one of the wireless charger and at least one chargeable device of the plurality of chargeable devices (depicted by numeral 682).

Scheduling for transmission of wireless power, according to one or more of the various exemplary embodiments described herein, may enable for maximization of wireless power transfer efficiency, prioritization of chargeable devices, prioritization of chargeable device users, and increased battery-life protection and fairness in charging.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the exemplary embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the exemplary embodiments shown herein but is to be accorded the widest scope consistent with the principles and novel features disclosed herein.

What is claimed is:

1. A wireless charger for charging a plurality of chargeable devices, the wireless charger comprising:
    a processor configured to determine a charging schedule for the plurality of chargeable devices based on a dynamic attribute of a battery of a chargeable device of the plurality of chargeable devices positioned within a charging region, the charging schedule comprising a charging time duration for each of the plurality of chargeable devices; and
    a transmitter configured to convey wireless power to the plurality of chargeable devices according to the charging schedule.

2. The wireless charger of claim 1, wherein the processor is further configured to determine the charging schedule based on a static attribute associated with the chargeable device.

3. The wireless charger of claim 2, wherein the static attribute identifies at least one of a type of the chargeable device, a model of the chargeable device, a user of the chargeable device, a type of the battery of the chargeable device, a model of the battery, a charging capacity of the battery, and a charging rate function of the battery.

4. The wireless charger of claim 1, wherein the dynamic attribute of the battery of the chargeable device comprises attributes identifying at least one of a state of charge of the battery of the chargeable device, a temperature of the battery, and an age of the battery.

5. The wireless charger of claim 1, wherein the processor is further configured to determine the charging schedule based on an environmental attribute identifying an interference pattern between two or more chargeable devices of the plurality of chargeable devices positioned within the charging region of the wireless charger.

6. The wireless charger of claim 1, further comprising a database configured to store an attribute associated with the chargeable device.

7. The wireless charger of claim 1, wherein the processor is further configured to retrieve an attribute associated with the chargeable device from a remote database.

8. The wireless charger of claim 1, wherein the processor is further configured to derive an attribute associated with the chargeable device from another attribute associated with the chargeable device.

9. The wireless charger of claim 1, wherein the processor is further configured to receive the dynamic attribute from the chargeable device and update the schedule in response thereto while conveying power to the chargeable device.

10. The wireless charger of claim 1, wherein the processor is further configured to determine the charging time duration for each of the plurality of chargeable devices according to a weighted factor assigned to each of the plurality of chargeable devices.

11. The wireless charger of claim 1, wherein the transmitter is configured to convey wireless power via one coil to the plurality of chargeable devices.

12. A method for charging a plurality of chargeable devices, the method comprising:
    determining a charging schedule for the plurality of chargeable devices positioned within a charging region of a wireless charger based on a dynamic attribute of a battery of a chargeable device of the plurality of chargeable devices, the charging schedule comprising a charging time duration for each of the plurality of chargeable devices; and
    wirelessly transmitting power to the plurality of chargeable devices according to the charging schedule.

13. The method of claim 12, wherein determining the charging schedule is further based on a static attribute identifying at least one of a type of the chargeable device, a model of the chargeable device, a user of the chargeable device, a type of the battery of the chargeable device, a model of the battery, a charging capacity of the battery, and a charging rate function of the battery.

14. The method of claim 12 wherein the dynamic attribute of the battery of the chargeable device comprises attributes identifying at least one of a state of charge of the battery of the chargeable device, a temperature of the battery, and an age of the battery.

15. The method of claim 12, wherein determining the charging schedule is further based on an environmental attribute identifying an interference pattern between two or more chargeable devices of the plurality of chargeable devices positioned within the charging region of the wireless charger.

16. The method of claim 12, wherein determining the charging schedule is further based on a configurable attribute identifying at least one of a user priority level associated with the chargeable device and a device priority level associated with the chargeable device.

17. The method of claim 12, further comprising:
    retrieving an attribute associated with the chargeable device from the chargeable device.

18. The method of claim 12, wherein wirelessly transmitting power to the plurality of chargeable devices comprises wirelessly transmitting power via one coil.

19. The method of claim 12, further comprising:
    assigning a weighted factor to each of the plurality of chargeable devices; and
    determining an order in which to charge each of the plurality of chargeable devices according to the weighted factor assigned to each chargeable device.

20. The method of claim 12, further comprising:
    assigning a priority level to each of the plurality of chargeable devices; and
    determining an order in which to charge each of the chargeable devices according to the priority level assigned to each chargeable device.

21. A wireless charger for charging a plurality of chargeable devices, the wireless charger comprising:
    means for determining a charging schedule for the plurality of chargeable devices bases on a dynamic attribute of a battery associated with a chargeable device of the plurality of chargeable devices positioned within a charging region of a wireless charger, the charging schedule comprising a charging time duration for each of the plurality of chargeable devices; and
    means for conveying wireless power to the plurality of chargeable devices according to the charging schedule.

22. The charger of claim 21, wherein the means for conveying wireless power comprises one coil.

23. A method, comprising:
    determining a desired charging parameter for a chargeable device according to a dynamic attribute of a battery associated therewith, the desired charging parameter is determined from at least one of a rate of charge, a charging duration, or a maximum rate of charge; and
    transmitting a charging request from the chargeable device to a wireless charger requesting a charge in accordance with the desired charging parameter, the charging request comprising a validity time duration during which the charging request is valid.

24. A chargeable device, comprising:
- a processor configured to determine a desired charging parameter according to a dynamic attribute of a battery of the chargeable device, the desired charging parameter is determined from at least one of a rate of charge, a charging duration, or a maximum rate of charge; and
- a transmitter configured to transmit a charging request to a wireless charger requesting a charge in accordance with the desired charging parameter, the charging request comprising a validity time duration during which the charging request is valid.

25. The chargeable device of claim 24, wherein the desired charging parameter is determined from at least two of a rate of charge, a charging duration, and a maximum rate of charge.

26. The chargeable device of claim 25, wherein the processor is further configured to retrieve an attribute related to the battery from a remote database.

27. A non-transitory computer-readable media storing instructions that when executed by a processor cause the processor to perform a method, the method comprising:
- determining a charging parameter for a chargeable device based on a dynamic attribute of a battery of the chargeable device;
- transmitting a charging request from the chargeable device to a wireless charger requesting a charge in accordance with the charging parameter, the charging request comprising a validity time duration during which the charging request is valid; and
- scheduling for transmission of wireless power to a chargeable device of a plurality of chargeable devices based on a dynamic attribute of a battery of the chargeable device.

28. The computer-readable media of claim 27, wherein the charging parameter comprises at least one of a rate of charge, a charging duration, and a maximum rate of charge.

29. A chargeable device, comprising:
- means for determining a charging parameter according to an attribute associated therewith; and
- means for transmitting a charging request to a wireless charger requesting a charge in accordance with the charging parameter, the charging request comprising a validity time duration during which the charging request is valid.

30. The chargeable device of claim 29, wherein the charging parameter comprises at least one of a rate of charge, a charging duration, and a maximum rate of charge.

* * * * *